June 30, 1942. P. C. KEITH, JR., ET AL 2,288,461
SEPARATING HYDROCARBON FLUIDS
Filed June 30, 1939
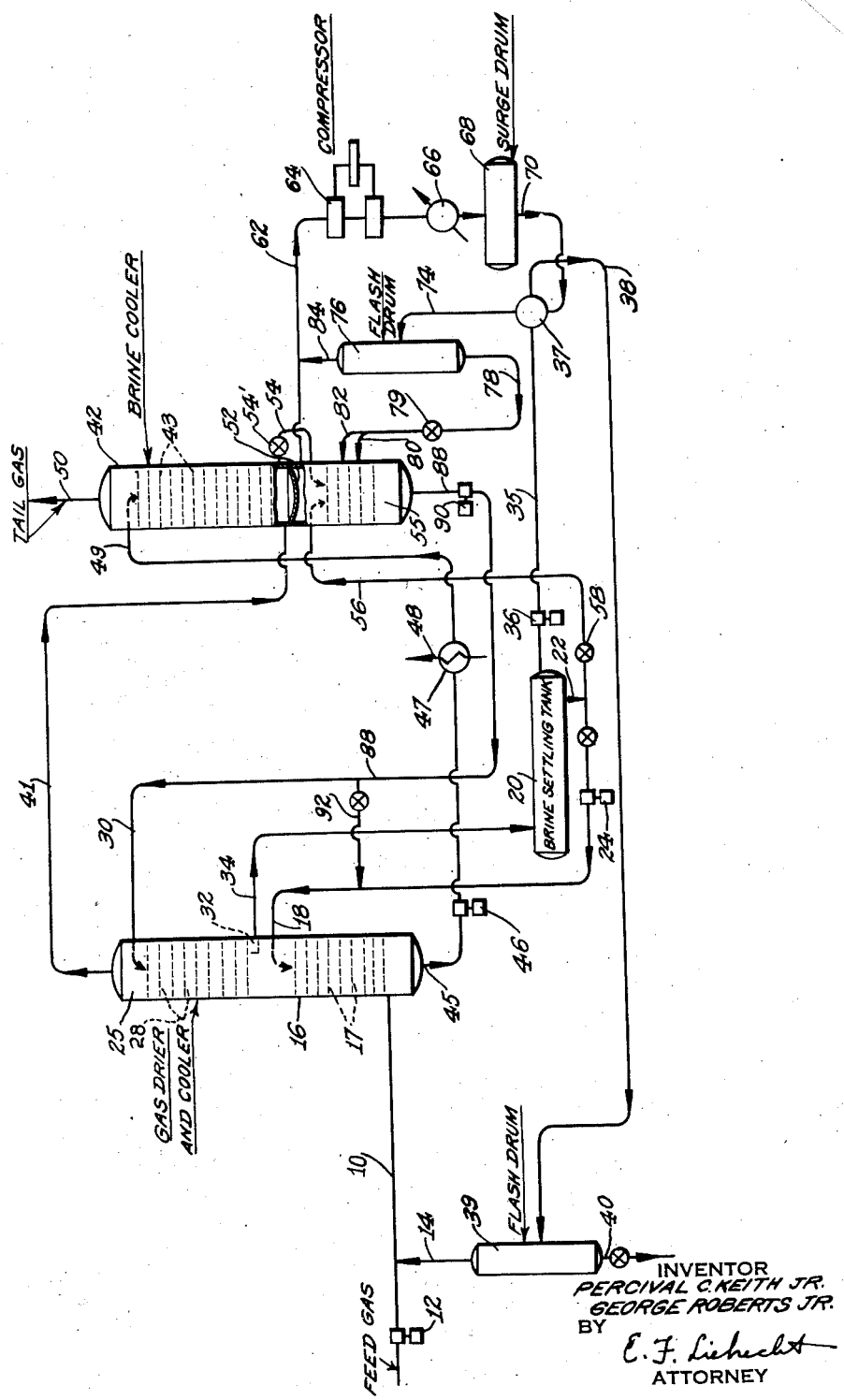
INVENTOR
PERCIVAL C. KEITH JR.
GEORGE ROBERTS JR.
BY
E. F. Liebrecht
ATTORNEY Patented June 30, 1942

2,288,461

UNITED STATES PATENT OFFICE 2,288,461

SEPARATING HYDROCARBON FLUIDS

Percival C. Keith, Jr., Peapack, and George Roberts, Jr., Montclair, N. J., assignors to The M. W. Kellogg Company, New York, N. Y., a corporation of Delaware Application June 30, 1939, Serial No. 282,113

18 Claims. (Cl. 62—175.5)

This invention relates to treating gaseous mixtures to separate desired components therefrom and more particularly relates to the separation of higher molecular weight hydrocarbons from gaseous mixtures containing hydrocarbons.

In the separation of higher molecular weight hydrocarbons from gaseous mixtures where low temperatures are used it is advisable to remove moisture from the gases so as to prevent the deposition of frost and ice on parts of the equipment used in treating the gaseous mixtures. Before cooling the gases to a relatively low temperature and preferably above 32° F., it is advisable to remove water vapor from the gases so as to inhibit the formation of solid gas hydrates. The gases to be treated may be natural gas, cracking still gases, refinery gases or other gases separated from products resulting from conversion operations. In one form of the invention the feed gas is introduced into the lower portion of a gas drying and cooling zone where it is intimately mixed with cold brine introduced into the upper portion of the first cooling zone to dry the gas. The brine comprises a relatively concentrated aqueous solution of calcium chloride or lithium chloride.

The gas as it passes upwards in countercurrent to the downwardly flowing brine is partly cooled and substantially all of the water or moisture is removed from the gas. The gas is then passed through a second gas cooling zone where it is intimately contacted with refrigerated brine introduced into the upper portion of the second gas cooling zone so that the refrigerated brine and partially cooled gas flow in countercurrent relation. The refrigerated brine comprises a relatively concentrated aqueous solution of lithium chloride or calcium chloride. In the second gas cooling zone the temperature of the gas is reduced to a relatively low temperature and condensation of some of the hydrocarbon constituents occurs. The higher molecular weight hydrocarbons are condensed together with some of the lower molecular weight hydrocarbons present in the feed gas. The condensate and substantially all of the brine collect in the lower portion or bottom of the second gas cooling zone and are withdrawn therefrom and introduced to a brine settling zone where the brine forms the lower layer and the condensed hydrocarbons condensate forms the upper layer.

The uncondensed gases leave the upper portion the second gas cooling zone and are introduced to the lower portion of a brine stripping and cooling zone where they are intimately mixed and contacted with downwardly flowing diluted brine containing absorbed moisture, the brine being withdrawn from the bottom portion of the gas drying and cooling zone. The brine withdrawn from the gas drying and cooling zone contains the moisture which was absorbed from the feed gas introduced into the gas drying and cooling zone and in order to recirculate the brine and use it for further drying of the feed gas, it is necessary to remove the absorbed moisture. The withdrawn brine is preferably heated to raise its temperature and is then contacted with the dry, cold, uncondensed gases leaving the second gas cooling zone as above described and in this way the cold unabsorbed gases become heated and absorb water from the brine to reconcentrate the brine.

The reconcentrated brine which has been partly cooled by the dry, cold, gas is withdrawn from the bottom of the brine stripping and cooling zone and introduced into a second brine cooling zone. A portion of the brine from the brine settling zone above described is also withdrawn and introduced into the second brine cooling zone. The brine introduced into this second brine cooling zone is directly contacted with cold evaporating propane or the like to lower the temperature of the brine to a refrigerating temperature. If desired, the propane and brine may be indirectly contacted, and other refrigerants may be used instead of propane. The refrigerated brine is withdrawn from the bottom of the second brine cooling zone and is used as the refrigerated brine for cooling the dried and partly cooled gas introduced into the second gas cooling zone above mentioned. In cooling the brine, the propane is vaporized and the vaporized propane is removed from the upper portion of the second brine cooling zone, compressed and cooled and returned to the second brine cooling zone for cooling additional amounts of brine.

Another portion of the brine contained in the brine settling zone is withdrawn and used as the relatively cold brine introduced into the upper portion of the gas drying and cooling zone where it contacts the feed gas and cools the feed gas and at the same time removes substantially all the moisture from the feed gas.

The condensed hydrocarbons forming the upper liquid layer in the brine settling zone are at a relatively low temperature. The condensed hydrocarbons are withdrawn and passed through a heat exchanger in indirect contact with compressed and cooled propane for further cooling the propane before it is used as a refrigerant in the second brine cooling zone. The condensed hydrocarbons become heated in this heat exchanger and are passed to a collecting drum to separate condensed or liquid hydrocarbons from gases. The separated condensed hydrocarbons may be withdrawn and passed to storage or they may be further treated in any desired manner, as, for example, in a conversion zone, such as a polymerization zone, for the production of motor fuels. The separated gases are preferably mixed with the feed gas and introduced into the first gas cooling zone above mentioned. Casinghead gasoline may be obtained by treating natural gas according to this process.

In the drawing, the figure diagrammatically represents the preferred form of apparatus adapted for use in practicing this invention. While one form of apparatus has been shown it is to be understood that other forms of apparatus may be used.

Referring now to the drawing, the reference character 10 designates a line through which a feed gas containing hydrocarbons is passed by means of pump 12. If the gas is under sufficient pressure, the pump 12 may be omitted. The feed gas may be refinery gas, cracking still gas, gases separated from products of conversion leaving a conversion zone, natural gas or the like. If the gas is under a relatively low pressure a compressor may be used in place of the pump 12 to raise the pressure on the gas. Recycle gas separated from condensed hydrocarbons obtained in this process as will be later described in greater detail are preferably passed through line 14 and mixed with the feed gas passing through line 10.

The feed gas is introduced into the lower portion of a gas cooling and drying zone 16 provided with a plurality of spaced trays 17. A relatively cold and concentrated brine such as an aqueous solution of lithium chloride, calcium chloride or other dehydrating agent, is passed through line 18 and introduced into the upper portion of the gas cooling and drying zone 16 for contact with the feed gas. The feed gas contains water vapor or moisture which it is desirable to remove before cooling the feed gas to separate desired hydrocarbons therefrom. If the water vapor were not removed, ice and frost would accumulate on the apparatus and solid gas hydrates also would form. For this reason the feed gas is contacted with a relatively cold and concentrated brine to remove moisture from the feed gas and at the same time to cool the feed gas.

A portion of the relatively cold brine is withdrawn from brine settling tank 20 through line 22 and passed through line 18 by means of pump 24. In the gas cooling and drying zone 16, the feed gas moves upwardly in countercurrent flow to the downwardly moving brine introduced through line 18. The dried and partially cooled feed gas is then passed to a second gas cooling zone 25 where it is further contacted with refrigerated brine. The second cooling zone is provided with a plurality of spaced trays 28.

Refrigerated brine is introduced into the upper portion of the second gas cooling zone 25 through line 30 and the refrigerated brine passes downwardly over the trays 28 in countercurrent flow to the upwardly moving feed gas from the first gas cooling zone 16. In the second gas cooling zone 25 higher molecular weight hydrocarbons and some lower molecular weight hydrocarbons are condensed and the condensed hydrocarbons in flowing downwardly are fractionated to separate lighter hydrocarbons from desired heavier hydrocarbons, the heavier condensed hydrocarbons being collected in a trapout tray 32, located at the lower portion of the second gas cooling zone 25. All of the refrigerated brine which is introduced into the second gas cooling zone 25 is collected in the trapout tray 32 together with the condensed hydrocarbons and the condensed hydrocarbons and substantially all of the brine are withdrawn from trapout tray 32 and passed through line 34 into the brine settling tank 20 above described. In this brine settling tank the condensed hydrocarbons separate as the upper liquid layer and the brine separates as the lower liquid layer.

The condensed hydrocarbons are withdrawn as a liquid from the brine settling tank 20 and are passed through line 35 by pump 36 and then passed through a heat exchanger 37 for heating the condensed hydrocarbons to remove light constituents as gases. The heated condensed hydrocarbons are then passed through line 38 and introduced into an accumulating drum 39 wherein gases are separated from liquid. By heating the condensed hydrocarbons in the heat exchanger 37 a large portion of the lighter constituents is vaporized and then separated in the accumulating drum 39.

The liquid in drum 39 contains the desired hydrocarbons which have been separated from the feed gas and the liquid is withdrawn from the bottom of the drum 39 through valved line 40 and may either be passed to storage or heated alone or in admixture with hydrocarbon oil or liquid and passed through a conversion zone for conversion treatment. When gases are treated to recover natural gasoline, the natural gasoline may be used as such or may be stabilized and preferably used as a blending agent. The gases separated from the liquid in the drum 39 pass overhead through line 14 and are admixed with the feed gas passing through line 10 as above described.

The gases which were not condensed by contact with the refrigerated brine in the second gas cooling zone 25 pass overhead through line 41 and are introduced into the lower portion of the brine stripping and cooling zone 42 provided with spaced, horizontally extending trays 43. The uncondensed gases passing through line 41 are at a relatively low temperature and having been contacted with a cold brine are substantially dry and may be used to absorb moisture from a portion or all of the brine used in the process.

The brine collecting on the bottom of the gas drying and cooling zone 16 has absorbed substantially all the moisture from the feed gas and this diluted brine is passed through line 45 by pump 46 and through a heater 47 which may be heated by hot water or steam passing through line 48 so as to raise the temperature of the brine. The partly heated brine is then passed through line 49 and introduced into the upper portion of the brine stripper and cooler 42 where it is contacted with the cold and dry waste gas introduced into the lower portion of the brine stripper and cooler 42 through line 41. The brine and waste gas are intimately contacted in countercurrent flow and during this revivification the cold and dry waste gas becomes heated and absorbs moisture from the brine to revivify or reconcentrate the brine to substantially its original concentration and at the same time the brine has its temperature reduced. The waste gas or tail gas leaves the top of the brine stripper and cooler 42 through line 50.

The cooled and concentrated brine collects in the bottom portion of the brine stripper and cooler 42 in the bottom pan 52 from which it is withdrawn and passed through line 54 having a pressure reducing valve 54' and introduced into a second brine cooling or refrigerating zone 55. Another portion of the brine layer from brine settling tank 20 is withdrawn from the tank and passed through line 56 having pressure reducing valve 58 and introduced into the upper portion of the second brine cooling zone 55. From the above it will be seen that all the brine used in the system is refrigerated by being passed through the second brine cooling zone 55 and that all the refrigerated brine withdrawn from the bottom of zone 55 is introduced into second gas cooling zone 25. All the brine is recovered and withdrawn from the bottom of second gas cooling zone 25 and passed to the brine settling tank 20. A portion of the brine from tank 20 is used to dry the feed gas in the gas cooling and drying zone 16 and is then passed to the brine stripper and cooler 42 before being passed to the brine cooling zone 55.

In the second brine cooling zone 55 the brine introduced into the upper portion thereof through lines 54 and 56 is directly contacted with liquefied propane to refrigerate the brine by vaporizing the propane. The warmed and vaporized propane is withdrawn from the upper portion of the second brine cooling zone 55 through line 62 and is compressed by passing through compressor 64. The compressed propane is then cooled and liquefied by being passed through cooler 66 and is then introduced into an accumulating drum 68. The cooled and liquefied propane is withdrawn from the bottom of the drum 68 and is passed through line 70 and heat exchanger 37 wherein it is indirectly contacted with cold condensed hydrocarbons passing through line 35 to further cool the liquefied propane. The further cooled liquefied propane is then passed through line 74 to a flash drum 76 where propane vapors are separated from liquefied propane. The liquefied propane is withdrawn from the bottom of the drum 76 through line 78 and passed through pressure reducing valve 79 to reduce the pressure on the propane.

The liquefied propane under lower pressure is then introduced into an intermediate portion of the second brine cooling zone 55 through lines 80 and 82. The propane may be introduced into zone 55 at other points and one or more lines such as 80 may be used. Propane vapors from the flash drum 76 pass overhead through line 84 and are admixed with the propane vapors passing through line 62 to the compressor 64. Instead of using the refrigerant system shown, an absorption refrigeration system may be used.

The brine, refrigerated by contact with the propane, collects on the bottom of the second brine cooling zone 55 and is withdrawn from the bottom thereof and passed through line 88 by pump 90 and then passed through line 30 for introduction into the second gas cooling zone 25 above described. If it is desired to cool the brine in line 18 to a greater extent, some of the refrigerated brine from line 88 may be passed to line 18 through valved line 92.

While the gas cooling zones for drying and cooling the feed gas and the first and second brine cooling zones have been shown in separate units, it is to be understood that the gas cooling zones and brine cooling zones may be combined into a single unit or each of the cooling zones may be made and used as a separate unit.

Instead of using direct contact between the refrigerant and the brine in brine cooling zone 55, a heat exchanger construction may be used to provide indirect contact between the refrigerant and the brine. Other refrigerants than propane may be used and the invention is not to be limited to propane.

Where the cold, dry gas leaving the top of second cooling zone 25 is under a relatively high pressure, it may be passed through a heat exchanger for further cooling the propane leaving drum 68 through line 70 and may then be passed through an expansion engine to run compressor 64 or the energy from the expansion engine may be used in other ways. During the expansion the gas is further cooled and may be used to cool the stream of brine passing through line 56 to the brine cooling zone 55. If a compressor is used to compress the feed gas before introducing it into the gas drying and cooling zone 16, the expanded gas after cooling the brine stream and if it is still under sufficient pressure may be passed through an expansion engine to operate the last mentioned compressor before the expanded gas is introduced into the lower portion of the brine stripping and cooling zone 42 through line 41.

In some instances trapout tray 32 and lines 18 and 34 may be omitted and diluted brine and condensed hydrocarbons withdrawn from the bottom of cooling zone 16 may be passed to a brine settling tank 20 in which case a portion of the brine is passed to the brine stripping and cooling zone 42 to be reconcentrated and the rest of the brine together with the reconcentrated brine is introduced into the brine cooling zone 55 to be refrigerated.

If desired, mist extractors may be supplied to the top of zones 25, 42 and 55 to separate entrained liquid from the gases and vapors leaving these zones.

In some cases where smaller amounts of condensed hydrocarbons are recovered, the brine settling tank 20 and line 18 may be omitted and the condensed hydrocarbons may be withdrawn as an upper layer from the trapout tray 32 and the brine may be removed as a lower layer from the trapout tray. A portion of the brine from tray 32 is returned to and passes down through gas drying and cooling zone 16 and the diluted brine is heated and contacted with dry cold waste gas in brine stripper and cooler 42. The condensed hydrocarbons are preferably passed through a heat exchanger similar to 37 for cooling the propane passing through line 70 and are then passed to the flash drum 39. The other portion of the lower brine layer withdrawn from tray 32 is then preferably passed to the second brine cooling zone 55 together with the reconcentrated brine and all the refrigerated brine is introduced into the second gas cooling zone 25.

If desired, all the brine from brine settling tank 20 may be passed to the brine cooling zone 55 and a portion of the refrigerated brine from the bottom of zone 55 may be introduced into the upper portion of gas drying and cooling zone 16 through lines 92 and 18 and the diluted brine from the bottom of zone 16 may be passed to the brine stripper and cooler 42 for reconcentration before passing to the brine cooling zone 55. The rest of the refrigerated brine from the bottom of zone 55 would then be introduced into the gas cooling zone 25 and withdrawn from the bottom thereof together with condensed hydrocarbons and passed to brine settling tank 20.

One example of the invention will now be given but it is to be understood that this example is by way of illustration only and the invention may be used to treat feed gases having different compositions, and different operating conditions may be used to separate desired hydrocarbon constituents. The invention may be used to recover natural gasoline from hydrocarbon gases or to recover fractions containing C₃ and C₄ hydrocarbons which may be passed to a conversion zone such as a polymerization zone either alone or in admixture with hydrocarbon liquids to be converted.

A gaseous feed which may be used according to this invention is one having the following composition, the quantity of feed gas also being included:

|  | Pound mols per hour |
|---|---|
| Inert gases | 394.5 |
| Methane | 2269.6 |
| Ethylene | 17.5 |
| Ethane | 604.6 |
| Propylene | 21.8 |
| Propane | 579.0 |
| Butylene | 5.6 |
| Butane | 153.3 |
| Pentane and heavier | 4.8 |
| Total | 4050.7 |

The temperature of the feed gas is about 95° F. Before the feed gas is introduced into the gas drying and cooling section or zone 16 it is admixed with a stream of recycle gas from the accumulating drum or flash drum 39. The gas cooling zones 16 and 25 are maintained under about 200 lbs. per square inch pressure. The recycle gas is at a temperature of about 85° F. and has the following composition and the following quantities are used.

|  | Pound mols per hour |
|---|---|
| Methane | 36.4 |
| Ethylene | 0.9 |
| Ethane | 39.3 |
| Propylene | 3.5 |
| Propane | 81.0 |
| Butylene | 0.7 |
| Butane | 17.3 |
| Pentane and heavier | 0.2 |
| Total | 179.3 |

The feed gas together with the recycle gas is contacted with relatively cold, concentrated brine which is introduced into the gas drying and cooling zone 16 through line 18 at a temperature of about 10° F. The dried and partly cooled gas then passes to the second gas cooling zone 25 wherein it is contacted with refrigerated brine introduced into the upper portion of the second gas cooling zone 25 through line 30 at a temperature of about −30° F. During this cooling, condensation of the heavier components and some of the lighter components from the gas feed takes place and the condensed hydrocarbons are fractionated and heavier components are collected on trapout tray 32. The condensed hydrocarbons and substantially all of the brine at a temperature of about 10° F. collect in the trapout tray 32 in the bottom of the second gas cooling zone 25 and are withdrawn therefrom and passed through line 34 to the brine settling tank 20 wherein the condensed hydrocarbons from the upper liquid layer and the brine forms the lower liquid layer. The liquid containing the condensed hydrocarbons has the following composition and the following quantities are withdrawn:

|  | Pound mols per hour |
|---|---|
| Methane | 43.9 |
| Ethylene | 1.6 |
| Ethane | 81.6 |
| Propylene | 12.7 |
| Propane | 330.0 |
| Butylene | 5.7 |
| Butane | 153.5 |
| Pentane and heavier | 5.0 |
| Total | 634.0 |

The liquid layer containing the condensed hydrocarbons is at a temperature of about 10° F. and is then passed through heat exchanger 37 where it is heated to about 85° F. and returned to the flash drum 39 where the recycle gas is flashed off and leaves the flash drum through line 14. In the heat exchanger 37, the cold liquid containing the condensed hydrocarbons is indirectly contacted with cooled and compressed propane to reduce the temperature of the propane from about 100° F. to about 10° F.

The liquid separated from gases in the flash drum 39 contains the desired hydrocarbons separated from the gaseous feed. The liquid is withdrawn from the bottom of the drum 39 through line 40 and has the following composition and the following quantities are withdrawn:

|  | Pound mols per hour |
|---|---|
| Methane | 7.1 |
| Ethylene | 0.7 |
| Ethane | 41.6 |
| Propylene | 9.1 |
| Propane | 248.0 |
| Butylene | 4.9 |
| Butane | 136.0 |
| Pentane and heavier | 4.8 |
| Total | 452.2 |

The liquid withdrawn from the bottom of the flash drum 39 in this example and having the composition above set forth may be passed to a polymerization zone wherein it is maintained under such conditions as to form polymer gasoline. If desired, the separated liquid may be used for other purposes. Where natural gases are treated instead of the gaseous mixture above given, casinghead gasoline will be recovered and this gasoline is then preferably stabilized and may be used as a blending agent or may be further treated as desired in any suitable manner.

The amount of refrigerated brine to be circulated and which is introduced into the upper portion of the first gas cooling zone 25 is about 263,000 lbs. per hour. The brine used in this example is a 35% aqueous solution of lithium chloride.

As above described, a portion of the brine from the bottom of the settling tank 20 is passed through line 18 into the upper portion of the gas drying and cooling zone 16 to strip moisture from the feed gas while cooling the feed gas at the same time. About 70,000 lbs. per hour of this brine are passed through line 18 and the brine is at a temperature of about 10° F. The brine during contact with the feed gas is heated and becomes diluted by absorbing moisture from the feed gas. In order to concentrate the brine and reuse it, it is withdrawn from the bottom of the first gas cooling zone 16 at a temperature of about 90° F., and is then passed through line 45 and heater 47 wherein the brine is heated to about 115° F. The heated brine is then passed through line 49 and introduced into the upper portion of the brine stripper and cooler 42 wherein it contacts cold and dry gases which were uncondensed in the second gas cooling zone 25 and which pass overhead from zone 25 through line 41. The uncondensed gases are at a temperature of about —25° F. and they are contacted with the brine which has been heated to about 115° F. During this contact the uncondensed gases, which are cold and dry, become heated and absorb moisture from the diluted brine to concentrate the brine and at the same time cool the brine to about —14° F. The gases leaving the top of the brine stripper and cooler 42 have a temperature of about 110° F.

The waste and uncondensed gases leaving the upper portion of the second gas cooling zone 25 have about the following composition and about the following quantities are withdrawn:

|  | Pound mols per hour |
|---|---|
| Inert gases | 394.5 |
| Methane | 2262.1 |
| Ethylene | 16.8 |
| Ethane | 562.3 |
| Propylene | 12.6 |
| Propane | 330.0 |
| Butylene | 0.6 |
| Butane | 17.1 |
| Total | 3596.0 |

The rest of the brine from the brine settling tank 20 (193,000 lbs. per hour) at a temperature of about 10° F. is passed through line 56 into the second brine cooling zone 55 into which is also introduced the cooled and concentrated brine withdrawn from the bottom of the brine stripping and cooling zone 42 by means of line 54. All the brine introduced into the second brine cooling zone 55 at about 4° F. after admixture of the streams of brine is refrigerated to a temperature of about —30° F. and is withdrawn from the bottom of zone 55 and passed to the top of cooling zone 25 wherein it is used for refrigerating the feed gas.

The quantity of propane necessary to be recirculated to cool the total amount of brine (263,000 lbs. per hour) from 4° F. to —30° F. is about 32,600 lbs. per hour.

The brine cooling zone 42 is maintained under pressure of about 200 lbs. per square inch. Brine cooled zone 55 is maintained at about atmospheric pressure. The vaporized propane at a temperature of about 4° F. is withdrawn from the second brine cooling zone 55 and passed through compressor 64 and has its pressure increased to about 200 lbs. per square inch and its temperature is increased to about 140° F. The propane is then passed through condenser 66 and has its temperature reduced to about 100° F. and the cooled and liquefied propane is then introduced into the accumulator drum 68 wherein it is maintained under pressure of about 200 lbs. per square inch and at a temperature of about 100° F. The liquefied propane is then passed through heat exchanger 37 and has its temperature lowered to about 10° F. and passed to the flash drum 76 wherein vapors are separated from liquid. In the flash drum 76 the propane is maintained under a pressure of about 10 lbs. per square inch and at a temperature of about —30° F.

The pressure on the propane is reduced in passing through pressure reducing valve 79 and the propane is then introduced into the second brine cooling zone 55 at a temperature of about —30° F. and under about atmospheric pressure.

While one form of apparatus has been shown and one example of practicing the invention has been given for one feed gas, it is to be expressly understood that different forms of apparatus may be used, feed gases having different compositions may be used and different operating conditions may be used without departing from the spirit of the invention.

We claim:

1. A method of separating desired components from gaseous mixtures containing hydrocarbons which comprises passing a feed gas into the lower portion of a gas drying and cooling zone, contacting the feed gas with a relatively cold and concentrated brine introduced into the upper portion of said gas drying and cooling zone to cool the gas and remove moisture therefrom while diluting and warming the brine, passing the cooled and dried gas to a gas cooling zone provided with spaced trays, intimately contacting the cooled and dried gas with refrigerated brine introduced into the upper portion of the said gas cooling zone to reduce the temperature of the gas and condense higher molecular weight hydrocarbons and some lower molecular weight hydrocarbons, fractionating the condensed hydrocarbons in said gas cooling zone to remove lower molecular weight hydrocarbons from desired higher molecular weight hydrocarbons, removing cold, dry, uncondensed gas from the top of said gas cooling zone, withdrawing brine and condensed and fractionated hydrocarbons from the lower portion of said gas cooling zone and passing them to a brine settling zone to separate condensed hydrocarbons as an upper liquid layer from brine, withdrawing the condensed and fractionated hydrocarbons as a liquid product, withdrawing diluted brine from the bottom of said gas drying and cooling zone and contacting it in a brine stripping and cooling zone with the cold, dry, uncondensed gas from the top of said gas cooling zone to remove water from the brine and concentrate the brine, withdrawing a portion of the brine from the bottom of said brine settling tank and passing it into a second brine cooling zone, withdrawing concentrated brine from the bottom of said brine stripping and cooling zone and passing it into said second brine cooling zone, refrigerating the brine introduced into the second brine cooling zone by directly contacting the brine and liquefied refrigerant and vaporizing the refrigerant, withdrawing refrigerated brine from the botttom of said second brine cooling zone and using at least a portion thereof as the cooling medium in said gas cooling zone, withdrawing vaporized refrigerant from the top of said second brine cooling zone, compressing and cooling the withdrawn refrigerant and returning it to said second brine cooling zone.

2. A method as defined in claim 1 wherein another portion of the brine is withdrawn from the bottom of said brine settling tank and is used as the relatively cold and concentrated brine passed to said gas drying and cooling zone.

3. A method as defined in claim 1 wherein the condensed and fractionated hydrocarbons are passed in indirect contact with the compressed refrigerant to cool the compressed refrigerant while warming the condensed and fractionated hydrocarbons.

4. A method as defined in claim 1 wherein the condensed and fractionated hydrocarbons are passed in indirect contact with the compressed refrigerant to cool the compressed refrigerant while warming the condensed and fractionated hydrocarbons and the warmed hydrocarbons are passed to a flash drum to separate vapors from desired liquefied hydrocarbons, the separated vapors being admixed with the feed gas for recycling.

5. A method of separating desired components from gaseous mixtures containing hydrocarbons which comprises passing a feed gas into the lower portion of a gas drying and cooling zone, contacting the feed gas with a relatively cold and concentrated brine introduced into the upper portion of said gas drying and cooling zone to cool the gas and remove moisture therefrom while diluting and warming the brine, passing the cooled and dried gas to a gas cooling zone, intimately contacting the cooled and dried gas with refrigerated brine introduced into the upper portion of the said gas cooling zone to reduce the temperature of the gas and condense higher molecular weight hydrocarbons, removing cold, dry, uncondensed gas from the top of said gas cooling zone, withdrawing brine and condensed hydrocarbons from the lower portion of said gas cooling zone and passing them to a brine settling zone to separate condensed hydrocarbons as an upper liquid layer from brine, withdrawing the condensed hydrocarbons as a liquid product, withdrawing diluted brine from the bottom of said gas drying and cooling zone and contacting it in a brine stripping and cooling zone with the cold, dry, uncondensed gas from the top of said gas cooling zone to remove water from the brine and concentrate the brine, withdrawing a portion of the brine from the bottom of the brine settling tank and passing it into a second brine cooling zone, withdrawing concentrated brine from the bottom of said brine stripping and cooling zone and passing it into said second brine cooling zone, refrigerating the brine introduced into the second brine cooling zone, withdrawing refrigerated brine from the bottom of the second brine cooling zone and using at least a portion thereof as the cooling medium in said gas cooling zone.

6. A method as defined in claim 5 wherein the diluted brine is heated before it is contacted with the cold, dry, uncondensed gas.

7. A method of separating desired components from gaseous mixtures containing hydrocarbons which comprises passing a gaseous feed into a gas drying zone, therein intimately contacting the gaseous feed with a relatively concentrated brine to remove moisture from the gaseous feed while diluting the brine, passing the cooled and dried gas to a gas cooling zone, therein intimately contacting the cooled and dried gas with refrigerated brine to cool the gaseous feed and condense hydrocarbons therefrom, removing cold, dry uncondensed gas from said gas cooling zone, withdrawing brine and condensed hydrocarbons from said gas cooling zone and separating the brine from condensed hydrocarbons, withdrawing diluted brine from said gas drying zone and contacting it in a brine cooling zone with the cold, dry gas from said gas cooling zone to remove water from the brine and reconcentrate the brine, passing at least a portion of the brine withdrawn from said gas cooling zone to a second brine cooling zone, withdrawing reconcentrated brine from said first mentioned brine cooling zone and passing it into said second brine cooling zone, refrigerating the brine introduced into the second brine cooling zone, withdrawing refrigerated brine from the bottom of the second brine cooling zone and using at least a portion of it as the refrigerated brine passed to said gas cooling zone to refrigerate the dried gaseous feed introduced thereinto.

8. A method of separating desired components from gaseous mixtures containing hydrocarbons which comprises passing a gaseous feed into the lower portion of a gas drying and cooling zone, therein contacting the gaseous feed with a relatively cold and concentrated brine introduced into the upper portion of said gas drying and cooling zone to cool the gaseous feed and remove moisture from the gaseous feed while diluting and warming the brine, passing the cooled and dried gas to a gas cooling zone, intimately contacting the cooled and dried gas with refrigerated brine introduced into the upper portion of said gas cooling zone to further cool the gaseous feed and condense higher molecular weight hydrocarbons therefrom, fractionating the condensed hydrocarbons, removing cold, dry uncondensed gas from the top of said gas cooling zone, withdrawing brine and condensed hydrocarbons from the lower portion of said gas cooling zone and separating the brine from condensed hydrocarbons, withdrawing diluted brine from the bottom of said gas drying and cooling zone and contacting it in a brine cooling zone with the cold dry gas from the top of said gas cooling zone to remove water from the brine and reconcentrate the brine passing at least a portion of the brine withdrawn from said gas cooling zone to a second brine cooling zone, withdrawing concentrated brine from the bottom of said first mentioned brine cooling zone and passing it into said second brine cooling zone, refrigerating the brine introduced into the second brine cooling zone, withdrawing refrigerated brine from the bottom of the second brine cooling zone and using at least a portion thereof as the refrigerated brine passed to the top of said gas cooling zone to refrigerate the cooled and dried gaseous feed introduced thereinto.

9. A method of separating desired components from gaseous mixtures containing hydrocarbons which comprises passing a gaseous feed into a gas drying zone, therein contacting the gaseous feed with a relatively concentrated brine to dry the gaseous feed while diluting the brine, passing the dried gaseous feed to a gas cooling zone, therein intimately contacting the dried gas with refrigerated brine to cool the gaseous feed and to condense some hydrocarbons, removing cold and dry uncondensed gas from said gas cooling zone, withdrawing brine and condensed hydrocarbons from said gas cooling zone and separating the condensed hydrocarbons as a liquid product, withdrawing diluted brine from said gas drying zone and contacting it with the cold and dry uncondensed gas from said gas cooling zone to remove water from the brine and reconcentrate it, passing at least a portion of the brine withdrawn from said gas cooling zone to a brine cooling zone, using at least a portion of the cold brine withdrawn from said gas cooling zone as the cold and concentrated brine passed to said gas drying zone, passing reconcentrated brine into said brine cooling zone, refrigerating the brine introduced into said brine cooling zone, withdrawing refrigerated and reconcentrated brine from said brine cooling zone and passing at least a portion thereof to the top of said gas cooling zone to refrigerate the dried gaseous feed introduced thereinto.

10. A method of separating desired components from gaseous mixtures containing hydrocarbons which comprises contacting a gaseous feed with a relatively concentrated brine to dry the gaseous feed while diluting the brine, intimately contacting the dried gas with refrigerated brine to cool the gaseous feed and to condense some hydrocarbons, separating cold and dry uncondensed gas from brine and condensed hydrocarbons and separating the condensed hydrocarbons as a liquid product, withdrawing diluted brine from said gas drying step and contacting it with the cold and dry uncondensed gas to remove water from the brine and reconcentrate it, passing at least a portion of the brine used in said gas cooling step to a brine cooling zone, using at least a portion of the brine from said gas cooling step as the cold and concentrated brine to be used for contacting and drying the gaseous feed, passing reconcentrated brine into said brine cooling zone, refrigerating the brine introduced into said brine cooling zone, withdrawing refrigerated brine from said brine cooling zone and using at least a portion thereof as the brine to refrigerate the dried gaseous feed.

11. A method of separating desired components from gaseous mixtures containing hydrocarbons which comprises passing a gas into a gas drying and cooling zone, therein contacting the gas with a relatively cold and concentrated brine to remove moisture from the gas and diluting and warming the brine, passing the cooled and dried gas to a gas cooling zone, intimately contacting the cooled and dried gas with refrigerated brine in said gas cooling zone to cool and condense higher molecular weight hydrocarbon therein, removing cold and dry uncondensed gas from said gas cooling zone, withdrawing brine and condensed hydrocarbons from said gas cooling zone and separating the condensed hydrocarbons as a liquid product from brine, withdrawing diluted brine from said gas drying and cooling zone and contacting it in a brine cooling zone with the cold and dry gas from said gas cooling zone to remove water from the brine and reconcentrate it, passing at least a portion of the brine withdrawn from said gas cooling zone into a second brine cooling zone, withdrawing brine from said first mentioned brine cooling zone and passing it into said second brine cooling zone, refrigerating the brine introduced into the second brine cooling zone, withdrawing refrigerated brine from said second brine cooling zone and using at least a portion thereof as the refrigerated brine passed to said gas cooling zone.

12. A method as defined in claim 11 wherein another portion of the brine withdrawn from said gas cooling zone is used as the relatively cold and concentrated brine passed to said gas drying and cooling zone.

13. A method of separating desired components from gaseous mixtures containing hydrocarbons which comprises passing a gas into a gas drying and cooling zone, therein contacting the gas with a relatively cold and concentrated brine to remove moisture from the gas and diluting and warming the brine, passing the cooled and dried gas to a gas cooling zone, intimately contacting the cooled and dried gas with refrigerated brine in said gas cooling zone to cool and condense higher molecular weight hydrocarbon therein, withdrawing brine and condensed hydrocarbons from said gas cooling zone and separating the condensed hydrocarbons as a liquid product from brine, withdrawing diluted brine from said gas drying and cooling zone and reconcentrating the brine, passing at least a portion of the brine withdrawn from said gas cooling zone into a brine cooling zone, passing reconcentrated brine into said brine cooling zone, refrigerating the brine in said brine cooling zone, withdrawing refrigerated brine from said brine cooling zone and using at least a portion thereof as the refrigerated brine passed to said gas cooling zone.

14. A method of separating desired components from gaseous mixtures containing hydrocarbons which comprises passing a gas into a gas drying zone, therein contacting the gas with a relatively concentrated liquid hygroscopic medium to absorb moisture from the gas while diluting the hygroscopic medium, passing the dried gas to a gas cooling zone and therein intimately contacting the dried gas with a refrigerated liquid hygroscopic medium to cool and condense higher molecular weight hydrocarbon therein, removing cold and dry uncondensed gas from said gas cooling zone, withdrawing liquid hygroscopic medium and condensed hydrocarbons from said gas cooling zone and separating the condensed hydrocarbons as a liquid product from liquid hygroscopic medium, withdrawing diluted hygroscopic medium from said gas drying zone and contacting it with the cold and dry uncondensed gas from said gas cooling zone to remove water from the hygroscopic medium and reconcentrate it, passing at least a portion of the hygroscopic medium withdrawn from said gas cooling zone into a refrigerating zone, passing reconcentrated hygroscopic medium into said refrigerating zone, refrigerating the hygroscopic medium introduced into said refrigerating zone, withdrawing refrigerated hygroscopic medium from said refrigerating zone and using at least a portion of it as the refrigerated hygroscopic medum passed to said gas cooling zone.

15. A method as defined in claim 14 wherein the diluted hygroscopic medium is heated before it is contacted with the cold and dry unabsorbed gas.

16. A method of separating desired components from gaseous mixtures containing hydrocarbons which comprises passing a gas into a gas drying and cooling zone, therein contacting the gas with a relatively cold and concentrated brine to absorb moisture from the gas and cool the gas while diluting the brine and condensing higher molecular weight hydrocarbons, removing cold and dry uncondensed gases, withdrawing condensed hydrocarbons and diluted brine and separating condensed hydrocarbons as a liquid product, heating at least a portion of the diluted brine and contacting it while hot with the cold and dry uncondensed gas to reconcentrate the brine, passing at least a portion of the reconcentrated brine into a refrigerating zone to refrigerate the brine, withdrawing refrigerated brine and using at least a portion thereof as the relatively cold and concentrated brine passed to said gas cooling and drying zone.

17. A method of separating desired components from gaseous mixtures containing hydrocarbons which comprises intimately contacting a gaseous feed with a relatively concentrated brine to remove water from the gaseous feed and dry it while diluting the brine, thereafter intimately contacting the dried gaseous feed with refrigerated brine to cool the gaseous feed to a relatively low temperature and to condense hydrocarbons, separating cold and dry uncondensed gases, separating the condensed hydrocarbons, concentrating at least a portion of the diluted brine by contacting it with the cold and dry uncondensed gases, passing the reconcentrated brine into direct countercurrent contact with a volatile refrigerant to refrigerate the brine and vaporize the refrigerant, using at least a portion of the reconcentrated and refrigerated brine to cool the dried gaseous feed to a relatively low temperature to condense hydrocarbons, compressing and cooling the vaporized refrigerant and using said separated condensed hydrocarbons to cool the compressed refrigerant while warming said separated condensed hydrocarbons.

18. A method of separating desired components from gaseous mixtures containing hydrocarbons which comprises intimately contacting a gaseous feed with a relatively concentrated brine to remove water from the gaseous feed and dry it while diluting the brine, thereafter intimately contacting the dried gaseous feed with refrigerated brine to cool the gaseous feed to a relatively low temperature and to condense hydrocarbons, separating cold and dry uncondensed gases, using at least a portion of the brine from the gas cooling step as the concentrated brine passed to the gas drying step, separating the condensed hydrocarbons, heating and concentrating at least a portion of the diluted brine by contacting it with the cold and dry uncondensed gases, passing the reconcentrated brine into direct countercurrent contact with a volatile refrigerant to refrigerate the brine and vaporize the refrigerant, using at least a portion of the reconcentrated and refrigerated brine to cool the dried gaseous feed to a relatively low temperature to condense hydrocarbons.

PERCIVAL C. KEITH, Jr.
GEORGE ROBERTS, Jr.